Rex C. Wilson
Howard Van Jepmond INVENTORS.

BY George E. Frost
THEIR ATTORNEY

United States Patent Office 2,954,533
Patented Sept. 27, 1960

2,954,533

CATHODE-RAY TUBE BEAM SWEEP OSCILLATOR

Rex C. Wilson, Glenview, and Howard Van Jepmond, Evanston, Ill., assignors, by mesne assignments, to Hazeltine Research, Inc., Chicago, Ill., a corporation of Illinois Continuation of application Ser. No. 457,724, Sept. 22, 1954. This application July 2, 1958, Ser. No. 746,115

12 Claims. (Cl. 331—147)

General

The present invention relates to an improved sweep oscillator which is adapted to energize the deflection coil of a cathode-ray tube and is particularly suitable for use as the vertical sweep oscillator for a low voltage television receiver.

This application is a continuation of application Serial No. 457,724, filed September 22, 1954, and entitled "Cathode Ray Tube Beam Sweep Oscillator," now abandoned.

In the manufacture of television receivers for home use it is particularly desirable to operate the receiver at, say, 150 volts D.-C. By so doing it is possible to dispense with the power transformer, to operate the entire receiver from a single source of D.-C. voltage without step-down resistors, and achieve other advantages. Difficulties have been encountered, however, in designing such receivers because the vertical sweep oscillators require more than comparatively low D.-C. voltage available in the absence of a higher voltage source.

In accordance with the present invention, an improved vertical sweep oscillator is achieved which provides adequate vertical sweep power when operated at low D.-C. voltage, such as 125 volts, and yet does not require excessive driving power. In brief, the oscillator consists of a tetrode electron tube, such as a 25L6, having its anode and screen grid connected to the source of D.-C. voltage through a transformer to define an oscillatory circuit in conjunction with the cathode. A negative feedback circuit is defined in connection with the control grid by a capacitance network connected to the anode and control grid, which network is charged during positive excursions of the anode and thereafter discharges through a suitable resistance to give the increasing current flow required to sweep the ray beam progressively across the viewing screen. Negative synchronizing pulses are applied to the screen grid through the transformer winding to trigger the oscillator.

In operation, the negative synchronizing pulses decrease the screen voltage to precipitate an increased anode voltage which is fed back through the transformer to the screen grid to cause a further negative screen voltage swing. This feedback effect gives a progressive and steep negative voltage swing to the screen grid until it loses its control over the anode current, at which time the direction of swing reverses and the anode voltage swings in the negative direction. During the positive swing of the anode voltage the feedback capacitors to the control grid are charged by the control grid current flow, which charging occurs through the low time-constant charging circuit and the control grid cathode space path. Upon the negative swing of the anode, this low time-constant circuit is broken so that the capacitors can discharge only through the longer time-constant circuit provided for the purpose.

When the control grid swings negatively in response to the negative anode voltage swing, the screen grid loses control of anode current and the control grid takes control. Thus, once the capacitor charging cycle started by the synchronizing pulse is completed, the anode current uniformly rises under the control of the discharging capacitors in the control grid circuit.

An additional feature of the oscillator of the present invention resides in the fact that the synchronizing pulses are applied to the screen grid in such a fashion that voltage variations on the screen grid are not fed back into the synchronizing pulse source. This is believed to be due to the connection of the synchronizing pulse source through the transformer to the screen grid so that the transformer isolates the pulse source from the large voltage swings of the oscillator itself. In addition, by this arrangement the oscillator itself serves as a synchronizing pulse separator so that both vertical and horizontal pulses may be applied without separating circuits.

It is, therefore, a general object of the present invention to provide an improved oscillator for a cathode-ray tube sweep coil which operates effectively at low D.-C. voltage.

Another object of the present invention is to provide an improved oscillator for a cathode-ray tube sweep coil which does not feed back into the synchronizing supply circuits.

Another object of the present invention is to provide a sweep oscillator for the vertical sweep coils of a cathode-ray tube which can be triggered by the composite unsegregated vertical and horizontal synchronizing pulse wave.

Yet another object of the present invention is to provide an improved oscillator for generating saw-tooth waves that is especially suitable for operation on low voltage and employs but a single electron-discharge device or tube.

A further and additional object of the present invention is to provide an improved oscillator for energizing a cathode-ray tube sweep in which the magnitude of the oscillations can be readily controlled without adversely affecting the wave form and in which the recovery of control grid voltage can likewise be adjusted to achieve a positive locking of the oscillator under the control of the synchronizing pulses.

Another and further object of the present invention is to provide an oscillator of the above type which generates a linear sweep current wave suitable for reproduction of an undistorted television image.

In accordance with a particular form of the invention, an oscillator for generating a saw-tooth wave comprises an electron-discharge device effectively having a cathode, a control electrode, a screen electrode, and an anode, and means for biasing the anode and screen electrodes in a predetermined relation to the cathode. The oscillator also includes network means coupled to the anode, screen electrode, cathode, and the aforesaid biasing means and defining therewith an oscillatory system having positive feedback. The oscillator further includes a feed-back network coupled to the aforesaid control electrode and system for developing for the latter during trace portions of the saw-tooth wave negative feedback which overbalances the positive feedback during the aforesaid trace portions.

Also in accordance with the invention, an oscillator for generating a saw-tooth wave comprises an electron tube having a cathode, a control electrode, a screen electrode, and an anode, and means for biasing the anode and screen electrode positively in relation to the cathode whereby current normally flows between the anode and the cathode. The oscillator also includes network means coupled to the anode, screen electrode, and cathode and defining therewith an oscillatory system having a natural period short compared with the period of the saw-tooth wave and having sufficient positive feedback so that in the absence of other feedback an oscillation rapidly builds up until the anode-cathode current is interrupted. The oscillator further includes coupling means coupled to the control electrode and oscillatory system and providing negative feedback overbalancing the positive feedback when the control electrode-cathode path in the tube is not conducting and no substantial feedback when the path is conducting. The aforesaid coupling means includes a condenser which is rapidly charged by current flowing through the control electrode-cathode path when the anode-cathode current is being interrupted and thereafter renders the control electrode negative relative to the cathode. The oscillator additionally includes resistance means coupled to the condenser for discharging it at a relatively slow rate, whereby the potential of the control electrode gradually rises relative to that of the cathode and causes anode-cathode current to rise until the aforesaid path again becomes conductive and the cycle of the wave is completed.

Figures 1, 3:
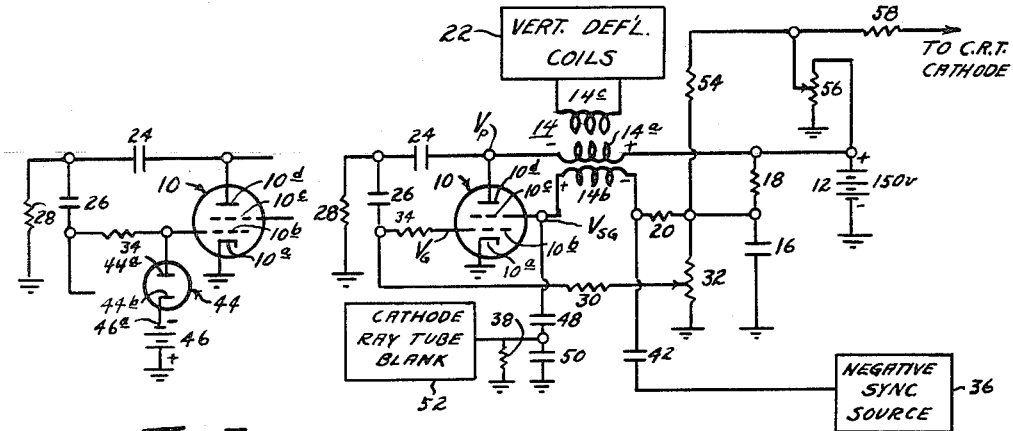
Fig. 1 is a schematic circuit diagram showing an oscillator constructed in accordance with the present invention.
Fig. 3 is a fragmentary schematic circuit diagram of an alternative embodiment of the present invention.

The novel features which we believe to be characteristic of our invention are set forth with particularity in the appended claims. Our invention itself, however, both as to its organization and method of operation, together with further objects and advantages thereof, will best be understood by reference to the following description taken in connection with the accompanying drawing, in which:

*Description of Fig. 1 oscillator*

Referring now to Fig. 1, there is shown at 10 an electron-discharge device or tube effectively having a cathode 10a, a control electrode 10b, a screen grid 10c, and an anode 10d. This tube may, for example, be a 25L6 beam power amplifier. The anode 10d and the screen grid 10c of the tube 10 are connected to the unidirectional voltage source 12 through network means comprising the windings 14a and 14b of the transformer 14, respectively, which bias the anode and screen electrodes in a predetermined or positive relation to the cathode, whereby current normally flows between the anode and the cathode. These windings are poled so that rising anode current in the positive direction in winding 14a gives rise to positive voltage at the screen grid 10c, thus forming a positive feedback system including the cathode 10a, the screen grid 10c, and the anode 10d.

The capacitor 16 serves to maintain a constant unidirectional voltage at the source side of the windings 14a and 14b. However, resistances 18 and 20 permit some excursions from this condition at the actual winding terminals. This is important in the case of the winding 14b since—as hereafter described—the synchronizing wave is applied to the tube 10 through this winding.

The vertical deflection coils of the cathode-ray tube—shown diagrammatically at 22—are connected to the tertiary winding 14c of the transformer 14. Since, as is described in detail hereafter, the current flow in windings 14a and 14b is rapidly changing, a correspondingly changing voltage wave is induced in winding 14c and the requisite sweep current wave flows through the vertical deflection coils. These coils straddle the neck of the cathode-ray tube in usual fashion and deflect the ray beam from its axial direction of travel to an extent determined by the value of the current.

Capacitors 24 and 26, acting in conjunction with resistors 28 and 30 and potentiometer 32, form a negative feedback circuit from the anode 10d to the control grid 10b. This path extends through variable resistance 34. As described hereafter, this feedback path serves to swing control grid 10b positively and then negatively during the synchronizing voltage pulse. The capacitors thereafter discharge to provide the linear ray beam sweep wave.

Negative synchronizing pulses are applied from source 36 to the junction of resistance 20 and winding 14b. In other words, these pulses are applied to the screen grid 10c through the screen winding 14b of the transformer 14. The circuit by which this is accomplished can be traced from source 36 through capacitor 42 to the screen winding 14b.

In a conventional television receiver, the synchronizing source 36 consists of the first detector, local oscillator and intermediate-frequency amplifiers which feed the second detector. The latter applies the complex video wave to suitable cutoff amplifiers which discard the picture component of the signal and pass only the horizontal and vertical synchronizing components. The resultant signal consists of vertical synchronizing pulses with a repetition rate of 60 per second and horizontal synchronizing pulses with a repetition rate of about 15,000 per second. These pulses are of substantially the same magnitude but the duration of the vertical synchronizing pulses is many times greater than the duration of each horizontal synchronizing pulse. As described hereafter, the circuit herein described may serve by its own inherent action to separate these two types of synchronizing pulses.

*Operation of Fig. 1 circuit*

Figure 2:
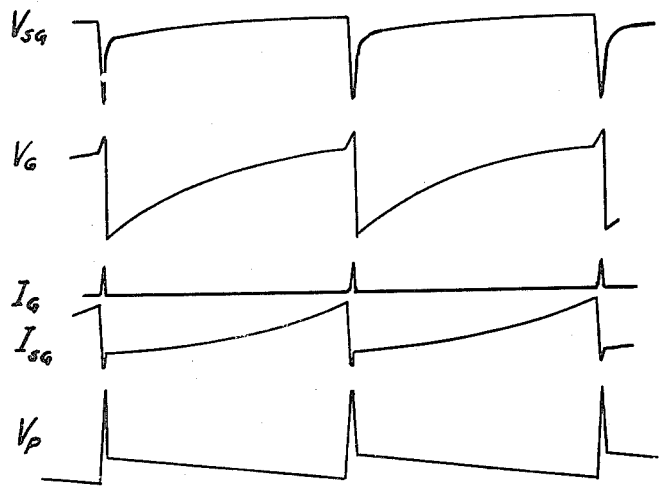
Fig. 2 is a diagrammatic representation of the wave forms in the oscillator of Fig. 1.

The practical operation of the above-described apparatus will best be evident from an examination of the wave forms shown in Fig. 2. This figure shows the wave forms on a common time scale, but not otherwise to scale.

The negative synchronizing pulses both horizontal and vertical from source 36 appear at capacitor 42. However, the horizontal pulses—with an approximately 15 kilocycle repetition rate and very short durations—do not appear at the screen grid 10c of the tube 10 because of the integrating action of the winding 14b in conjunction with the capacitors 48 and 50. The vertical pulses—with a 60 cycle repetition rate and comparatively long durations—do reach the screen grid 10c and thereby cause the sharp negative voltage swing which triggers the oscillator to execute a cycle of operation.

Once the voltage of screen grid 10c begins to fall due to the vertical synchronizing pulse, the positive feedback due to transformer 14 gives rise to an increasing screen grid voltage fall which is continued until the anode current is cut off. This action is due to the fact that the decreased anode current due to the falling screen grid voltage passes through the winding 14a. Upon anode current cutoff, the magnetic field in transformer 14 collapses at a rate determined by its natural frequency to induce a voltage in winding 14b which drives the voltage $V_{sg}$ further in the negative direction, thus completing the positive feedback cycle and causing buildup of the swing started by the synchronizing pulse.

The positive voltage pulse of the anode due to the anode-current fall is applied to the control grid 10b through capacitors 24 and 26. However, as soon as the control electrode 10b swings positive in relation to the cathode 10a the control electrode conducts current and thus holds its own voltage very close to the cathode potential. The capacitors 24 and 26 thus charge through the circuit extending from the anode 10d through the capacitors in series to the control grid 10b and thence to the cathode 10a. As resistance 34 is comparatively small (that is, less than a megohm) the time constant of this charging circuit is short.

It will be noted that capacitors 26 and 24 act as a capacitance voltage divider. The former may, for example, be about 0.0022 microfarad and the latter about 0.022 microfarad. Thus capacitor 26 experiences most of the voltage rise during the period the anode 10d is swinging in the positive direction.

As the anode 10d swings positively and the screen 10c swings negatively, the ability of the screen to control the anode space current decreases until finally a point is reached wherein control is lost. At this time the anode voltage $V_p$ continues to swing in a positive direction due to collapsing fields and the screen voltage continues to swing in the negative direction until the collapsing fields have dissipated their energy in a half cycle of oscillation at natural period of circuit, which period is short compared with the period of the saw-tooth wave developed for application to coils 22.

As the anode voltage $V_p$ swings sufficiently in the negative direction near the end of the self-oscillatory half cycle, the control electrode 10b partakes of the negative swing and moves negatively in relation to the cathode 10a. This is due to the fact that at this time control grid current ceases, so that the short time-constant charging circuit through the control electrode 10b is discontinued. The charge on capacitors 24 and 26 accordingly does not change rapidly and the control electrode executes a rapid and large negative voltage swing as shown by the curve $V_g$, Fig. 2.

During the negative swing of the control electrode 10b it takes control of the space current to the anode 10d. In other words, when the control electrode voltage is in the very negative region of Fig. 2 the voltage of the screen electrode 10c does not significantly affect the cathode-anode space current. At this time, therefore, the system composed of the anode 10d, transformer 14, and screen electrode 10c is no longer oscillatory and the rapid voltage swing at the anode 10d and the control electrode 10b is arrested. The screen voltage $V_{sg}$ accordingly tapers out from the rapid rise as shown by the curve $V_{sg}$, Fig. 2, and rises thereafter only at a relatively slow rate. The developed negative feedback may therefore be said to overbalance the positive feedback during the trace portions of the generated wave.

At the completion of the negative swing of the anode voltage $V_p$, the control electrode 10b has a negative potential due to the charge on capacitors 26 and 24. This charge, particularly that on the capacitor 26, leaks off through resistors 28, 30, and 32, thus causing the control electrode voltage to increase slowly and the anode current likewise to increase slowly as shown by the curves of Fig. 2. The anode potential $V_p$ likewise decreases slowly as shown by the curve $V_p$, Fig. 2.

By the time the next vertical synchronizing pulse is applied, the control electrode voltage $V_g$ has risen to a value wherein it no longer defeats the control exerted by the screen 10c over the anode space current. Hence, the application of the synchronizing pulse through the screen winding 14b to the screen 10c decreases the anode space current to give rise to the cycle of operations above described.

The potentiometer 32 serves as a hold control to assure that the oscillator executes one cycle in response to each synchronizing pulse. Alternatively, resistance 30 may be made variable for this purpose. In either event the rate of discharge of capacitors 24 and 26 is controlled so that the oscillator is conditioned to receive a new synchronizing pulse when each pulse arrives. Adjustment of potentiometer 32 (or resistance 30) accordingly fixes the voltage of control electrode 10b at the instant the synchronizing pulse is applied through winding 14b to the screen 10c. It can accordingly be adjusted to assure that the tube 10 is in condition to respond to each synchronizing pulse.

The resistance 28 combines with capacitor 24 to vary the voltage across capacitor 26 and resistances 30 and 32 during the time the capacitor 26 is discharging. This affords control of the linearity of the rising current wave to anode 10d to overcome the tendency of this portion of the wave to depart from linearity.

The capacitors 48 and 50 form a capacitance voltage divider which feeds voltage to the cathode-ray tube blanking circuit 52. In brief, this circuit applies pulses from the wave $V_{sg}$ to the control grid of the cathode-ray tube to interrupt the ray beam during the time vertical retrace is in effect. This structure is disclosed and claimed in our United States Patent No. 2,760,108.

One of the features of the present invention lies in the fact that the negative synchronizing source 36 is not subjected to high voltages fed back from the oscillator. This is believed to be due to the fact that the synchronizing pulse voltage is applied to the screen grid 10c through the winding 14b. Since most of the screen grid voltage swing appears across this winding, the winding serves by its presence to isolate the capacitor 42—and hence the synchronizing source 36—from these voltage excursions. Were it not for this isolating action, the synchronizing circuit would be required to withstand the effects of the large screen grid voltage swings and it would be necessary to provide isolating circuits for this purpose.

If desired, the resistance 18 may be made variable to control the positive potential on screen grid 10c. This controls the negative voltage swing of control electrode 10b and hence the extent of the current changes during the sweep oscillation. It thus varies the extent of the cathode-ray beam sweep and the size of the picture.

Since the required sweep current flow increases as the picture brightness is decreased, it is desirable to vary the extent of the ray beam deflection current swings with the intensity of the beam. This is accomplished in the circuit of Fig. 1 by the resistance 54 which—in conjunction with the brightness control potentiometer 56—varies the bias potential at screen grid 10c in accordance with the brightness of the picture, thus compensating for adjustment of such brightness. The potentiometer 56 controls the brightness of the picture by reason of its connection through resistance 58 to the cathode of cathode-ray tube, so that increased positive potential at the movable terminal of the potentiometer 56 decreases the picture brightness and simultaneously increases the amplitude of the sweep current wave applied to the vertical deflection coils 22.

In an actual television receiver with an anode supply voltage source of only 140 volts and a 21-inch cathode-ray picture tube, the following circuit values were used in the circuit of Fig. 1:

| | |
|---|---|
| Tube 10 | Type 25L6. |
| Resistance 18 | 18,000 to 68,000 ohms. |
| Capacitor 16 | 10 microfarads. |
| Potentiometer 32 | 97,000 ohms. |
| Resistance 20 | 1,800 ohms. |
| Capacitor 42 | 0.22 microfarads. |
| Capacitor 48 | 0.01 microfarads. |
| Capacitor 50 | 0.022 microfarads. |
| Resistance 38 | 47,000 ohms. |
| Resistance 30 | 2.2 megohms. |
| Resistance 34 | 390,000 to 640,000 ohms. |
| Capacitor 26 | 0.0022 microfarads. |
| Capacitor 24 | 0.022 microfarads. |
| Resistance 28 | 1.8 megohms. |
| Transformer 14: | |
| Anode winding 14a | 10,000 ohms at 60 cycles with 10 milliamperes D.-C. |
| Screen winding 14b | One-third the turns of the anode winding 14a. |
| Tertiary winding 14c | One twenty-fourth the turns of the anode winding 14a. |

It has been found that the oscillator of the present invention triggers effectively and reliably if fed with the composite synchronizing wave including both the horizontal and the vertical pulses. It is thus possible to use this oscillator in a television receiver without such integrating network and thereby simplify the receiver and avoid the expense of providing such network. This action of the oscillator is believed to be due to the effectiveness of screen winding 14a of the transformer 14 in passing only the relatively low-frequency broad 60-cycle vertical synchronizing pulses while not passing the relatively high-frequency sharp horizontal synchronizing pulses. The oscillator thus by its own inherent action serves as an integrating synchronizing pulse-separating device.

It should further be noted that since the synchronizing pulse source need not include an integrating device, the loss in signal level necessarily attendant upon the use of such device is avoided.

*Description of Fig. 3 circuit*

In the alternative construction of Fig. 3, the diode 44 has its anode 44a connected to the control electrode 10b of the tube 10 and its cathode 44b connected to the negative terminal 46a of the bias voltage source 46. Since the cathode 44b of the diode is negatively biased in relation to the anode 44a, the diode conducts unless the control electrode 10b of the tube 10 is biased negatively by approximately the voltage of bias source 46. With the circuit of Fig. 3 it is accordingly possible to control the extent the control electrode 10b can swing in the positive direction, including a control holding this electrode negative at all times. The operation of the circuit of Fig. 3 is like that of Fig. 1 except that the diode 44 conducts rather than the control electrode-cathode path of the tube 10.

While we have shown and described specific embodiments of the present invention it will be understood that numerous modifications and alternative constructions may be made without departing from the true spirit and scope thereof. We therefore by the following claims intend to cover all such modifications and alternative constructions as fall within their true spirit and scope.

What is claimed is:

1. A sweep oscillator for a cathode-ray tube comprising: a current-control device including a current-emitting electrode, a current-receiving electrode, and first and second control electrodes; means for applying negative synchronizing pulses to said second control electrode; means coupling said current-receiving and second control electrodes for driving the former positive and the latter negative responsive to said synchronizing pulses; means coupling said current-receiving and first control electrodes and responsive to the positive excursion of the former for causing the latter to draw current from said current-emitting electrode; means responsive to the latter current for driving said first control electrode negative and then slowly positive; and means responsive to the current to said current-receiving electrode as said first control electrode goes slowly positive for deriving a sweep voltage.

2. A sweep oscillator for a cathode-ray tube comprising: a current-control device including a current-emitting electrode, a current-receiving electrode, and first and second control electrodes; means for applying periodic negative synchronizing pulses to said second control electrode; means coupling said current-receiving and second control electrodes for driving the former positive and the latter negative responsive to said synchronizing pulses; means coupling said current-receiving and first control electrodes and responsive to the positive excursion of the former for causing the latter to draw current from said current-emitting electrode; means including a resistance-capacitance network chargeable by the latter current for driving said first control electrode negative and then slowly positive synchronously with said synchronizing pulses; and means responsive to the current to said current-receiving electrode as said first control electrode goes slowly positive for deriving a sweep voltage.

3. A sweep oscillator for a cathode-ray tube comprising: an electron tube including a cathode, an anode, a screen grid, and a control grid; means for applying periodic negative synchronizing pulses to said screen grid; means coupling said anode and screen grid for driving the anode positive and the screen grid negative responsive to said synchronizing pulses; means coupling said anode and control grid and responsive to the positive excursion of the anode for causing the control grid to draw current from said cathode; means including a resistance-capacitance network chargeable by the latter current for driving said control grid negative and then slowly positive synchronously with said synchronizing pulses; and means responsive to the current to said anode as said control grid goes slowly positive for deriving a sweep voltage.

4. A linear sweep oscillator for a cathode-ray tube beam-deflection coil comprising in combination: an electron tube having cathode, control, screen, and anode electrodes; means to supply positive bias voltage to the anode and screen electrodes, respectively, in relation to the cathode electrode; a transformer having an anode winding interposed between the anode electrode and said means and a screen winding interposed between the screen electrode and said means, said windings being in positive feedback relation to define an oscillatory system including the cathode, screen, and anode electrodes; a pair of series capacitors connecting the anode and control electrodes; means defining a discharge path for the capacitors including resistance means connecting the control electrode to the cathode electrode and resistance means connecting the junction of the series capacitors to the cathode electrode; and means to apply negative synchronizing pulses through the screen winding to the screen electrode.

5. A linear sweep oscillator for a cathode-ray tube beam-deflection coil comprising in combination: an electron tube having cathode, control, screen, and anode electrodes; means to supply positive bias voltage to the anode and screen electrodes, respectively, in relation to the cathode electrode; a transformer having an anode winding interposed between the anode electrode and said means and a screen winding interposed between the screen electrode and said means, said windings being in positive feedback relation to define an oscillatory system including the cathode, screen, and anode electrodes; a pair of series capacitors connecting the anode and control electrodes, one of said capacitors being relatively small in relation to the other and being connected to the control electrode so that most of the capacitor voltage appears between the junction of the capacitors and the control electrode; means defining a discharge path for the capacitors including resistance means connecting the control electrode to the cathode electrode and resistance means connecting the junction of the series capacitors to the cathode electrode; and means to apply negative synchronizing pulses through the screen winding to the screen electrode.

6. An oscillator for generating a saw-tooth wave comprising: an electron-discharge device effectively having a cathode, a control electrode, a screen electrode, and an anode; means for biasing said anode and screen electrode in a predetermined relation to said cathode; network means coupled to said anode, screen electrode, cathode, and biasing means and defining therewith an oscillatory system having positive feedback between said anode and screen electrode; and a feedback network, including a condenser coupled to said control electrode and said anode and operative to drive the control electrode-cathode path of said device to conduction during the negative build-up of voltage on said screen electrode and including a discharge path for said condenser having a time constant longer than that of the screen electrode build-up interval, for developing for said system during trace portions of said wave negative feedback which overbalances said positive feedback during said trace portions, 7. An oscillator for generating a saw-tooth wave comprising: an electron-discharge device effectively having a cathode, a control electrode, a screen electrode, and an anode; means for biasing said anode and screen electrode in a predetermined relation to said cathode; network means coupled to said anode, screen electrode, cathode, and biasing means and defining therewith an oscillatory system having positive feedback between said anode and screen electrode; and a feedback network, including a pair of series-connected condensers coupled between said control electrode and said anode, resistance means coupled between said control electrode and said cathode, and resistance means connected between the junction of said condensers and said cathode, for developing for said system during trace portions of said wave negative feedback which overbalances said positive feedback during said trace portions.

8. An oscillator for generating a saw-tooth wave comprising: an electron tube having a cathode, a control electrode, a screen electrode, and an anode; means biasing said anode and screen electrode positively in relation to said cathode whereby current normally flows between said anode and cathode; network means coupled to said anode, screen electrode, and cathode and defining therewith an oscillatory system having a natural period short compared with the period of said wave and having sufficient positive feedback between said anode and screen electrode so that in the absence of other feedback an oscillation rapidly builds up until said anode-cathode current is interrupted; coupling means coupled to said control electrode and oscillatory system and providing negative feedback overbalancing said positive feedback when the control electrode-cathode path in said tube is not conducting and no substantial feedback when said path is conducting, said coupling means including a condenser which is rapidly charged by current flowing through said path when said anode-cathode current is being interrupted and thereafter renders said control electrode negative relative to said cathode; and resistance means coupled to said condenser for discharging it at a relatively slow rate, whereby the potential of said control electrode gradually rises relative to that of said cathode and causes said anode-cathode current to rise until said path again becomes conductive and the cycle of said wave is completed.

9. An oscillator for generating a saw-tooth wave comprising: an electron tube having a cathode, a control electrode, a screen electrode, and an anode; means biasing said anode and screen electrode positively in relation to said cathode whereby current normally flows between said anode and cathode; network means coupled to said anode, screen electrode, and cathode and defining therewith an oscillatory system having a natural period short compared with the period of said wave and having sufficient positive feedback between said anode and screen electrode so that in the absence of other feedback an oscillation rapidly builds up until said anode-cathode current is interrupted; coupling means coupled to said control electrode and oscillatory system and providing negative feedback between said anode and control electrode overbalancing said positive feedback when the control electrode-cathode path in said tube is not conducting and no substantial feedback when said path is conducting, said coupling means including a condenser which is rapidly charged by current flowing through said path when said anode-cathode current is being interrupted and thereafter renders said control electrode negative relative to said cathode; resistance means coupled to said condenser for discharging it at a relatively slow rate, whereby the potential of said control electrode gradually rises relative to that of said cathode and causes said anode-cathode current to rise until said path again becomes conductive and the cycle of said wave is completed; and means coupled to said control electrode for causing said path to be conducting in the absence of oscillation, whereby oscillation is initiated.

10. An oscillator for generating a saw-tooth wave comprising: an electron tube having a cathode, a control electrode, a screen electrode, and an anode; means biasing said anode and screen electrode positively in relation to said cathode whereby current normally flows between said anode and cathode; network means coupled to said anode, screen electrode, and cathode and defining therewith an oscillatory system having a natural period short compared with the period of said wave and having sufficient positive feedback between said anode and screen electrode so that in the absence of other feedback an oscillation rapidly builds up until said anode-cathode current is interrupted; coupling means coupled to said control electrode and oscillatory system and providing negative feedback between said anode and control electrode overbalancing said positive feedback when the control electrode-cathode path in said tube is not conducting and no substantial feedback when said path is conducting, said coupling means including a condenser which is rapidly charged by current flowing through said path when said anode-cathode current is being interrupted and thereafter renders said control electrode negative relative to said cathode; resistance means coupled to said condenser for discharging it at a relatively slow rate, whereby the potential of said control electrode gradually rises relative to that of said cathode and causes said anode-cathode current to rise; and means for applying control pulses to said oscillatory system to render said path conducting, whereby the cycle of said saw-tooth wave is completed.

11. An oscillator for generating a saw-tooth wave comprising: an electron tube having a cathode, a control electrode, a screen electrode, and an anode; means biasing said anode and screen electrode positively in relation to said cathode whereby current normally flows between said anode and cathode; network means coupled to said anode, screen electrode, and cathode and defining therewith an oscillatory system having a natural period short compared with the period of said wave and having sufficient positive feedback between said anode and screen electrode so that in the absence of other feedback an oscillation rapidly builds up until said anode-cathode current is interrupted; coupling means coupled to said control electrode and oscillatory system and providing negative feedback between said anode and control electrode overbalancing said positive feedback when the control electrode-cathode path in said tube is not conducting and no substantial feedback when said path is conducting, said coupling means including a condenser which is rapidly charged by current flowing through said path when said anode-cathode current is being interrupted and thereafter renders said control electrode negative relative to said cathode; resistance means coupled to said condenser for discharging it at a relatively slow rate, whereby the potential of said control electrode gradually rises relative to that of said cathode and causes said anode-cathode current to rise; and means for applying control pulses to said screen electrode to render said path conducting, whereby the cycle of said saw-tooth wave is completed.

12. An oscillator for generating a saw-tooth wave comprising: an electron tube having a cathode, a control electrode, a screen electrode, and an anode; means biasing said anode and screen electrode positively in relation to said cathode whereby current normally flows between said anode and cathode; network means coupled to said anode, screen electrode, and cathode and defining therewith an oscillatory system having a natural period short compared with the period of said wave and having sufficient positive feedback between said anode and screen electrode so that in the absence of other feedback an oscillation rapidly builds up until said anode-cathode current is interrupted; coupling means coupled to said control electrode and oscillatory system and providing negative feedback between said anode and control electrode overbalancing said positive feedback when the control electrode-cathode path in said tube is not conducting and no substantial feedback when said path is conducting, said coupling means including a pair of series-connected condensers between said anode and control electrode which are rapidly charged by current flowing through said path when said anode-cathode current is being interrupted and thereafter renders said control electrode negative relative to said cathode; resistance means coupled to said condensers for discharging them at a relatively slow rate, whereby the potential of said control electrode gradually rises relative to that of said cathode and causes said anode-cathode current to rise until said path again becomes conductive and the cycle of said wave is completed; and means for linearizing said wave including a resistor connected between the junction of said condensers and said cathode and further including the condenser of said pair connected to said anode.

References Cited in the file of this patent

FOREIGN PATENTS

| | | |
|---|---|---|
| 142,680 | Australia | Nov. 13, 1947 |
| 506,856 | Great Britain | June 6, 1939 |
| 510,837 | Belgium | May 15, 1952 |
| 643,993 | Great Britain | Oct. 4, 1950 |
| 683,109 | Great Britain | Nov. 19, 1952 |